(12) United States Patent
Hicks

(10) Patent No.: US 10,751,655 B2
(45) Date of Patent: Aug. 25, 2020

(54) SWIMMING POOL FILTER CARTRIDGE WASHER

(71) Applicant: Tim Hicks, Lake Mary, FL (US)

(72) Inventor: Tim Hicks, Lake Mary, FL (US)

(73) Assignee: Timothy Hicks, Pickens, SC (US)

( * ) Notice: Subject to any disclaimer, the term of this patent is extended or adjusted under 35 U.S.C. 154(b) by 344 days.

(21) Appl. No.: 15/974,872

(22) Filed: May 9, 2018

(65) Prior Publication Data

US 2019/0344205 A1 Nov. 14, 2019

(51) Int. Cl.
*B01D 41/04* (2006.01)
*E04H 4/16* (2006.01)
*B08B 3/02* (2006.01)

(52) U.S. Cl.
CPC .............. *B01D 41/04* (2013.01); *B08B 3/024* (2013.01); *E04H 4/16* (2013.01)

(58) Field of Classification Search
CPC .................................. E04H 3/16; B08B 3/024
USPC .............. 210/169, 409, 420, 167.14; 134/86
See application file for complete search history.

(56) References Cited

U.S. PATENT DOCUMENTS

| | | | | |
|---|---|---|---|---|
| 6,156,213 A * | 12/2000 | Dudley | ................. | B01D 41/04 134/138 |
| 7,282,086 B2 * | 10/2007 | Stuckey | ................ | B01D 41/04 134/153 |
| 7,828,964 B1 * | 11/2010 | Neibert | .................. | B01D 41/04 134/198 |
| 10,253,515 B2 * | 4/2019 | Rejniak | ................ | B01D 29/114 |
| 2002/0166578 A1 * | 11/2002 | Leblond | ................. | B08B 3/045 134/99.2 |
| 2004/0200770 A1 * | 10/2004 | Clary | .................. | B01D 35/157 210/391 |
| 2006/0243309 A1 * | 11/2006 | Prescott | ................ | B44D 3/006 134/33 |
| 2011/0000506 A1 * | 1/2011 | Martin | ................. | B08B 9/0433 134/18 |
| 2016/0032603 A1 * | 2/2016 | Hegi | ........................ | E04H 4/16 210/248 |

* cited by examiner

*Primary Examiner* — Nina Bhat

(57) ABSTRACT

Described is a mechanical device and method for cleaning pool cartridge filters. In its essence, the mechanism is comprised of a cylindrical body with a spinning floor and two water tubes. One water tube runs through the middle from top to bottom, and the second water tube runs longitudinally along the inner wall. A filter cartridge is inserted into the body over the center sprayer. A lid is attached after the cartridge is inserted, and the water is turned on. Pressurized water is delivered through holes in the center and side sprayers, flushing the inside and outside of the filter cartridge until clean. There are special holes in the side sprayer which are angled to propel the rotation of the filter cartridge on the spinning floor, insuring a uniform delivery of water along the filter walls. The system runs from a garden hose.

18 Claims, 3 Drawing Sheets

SWIMMING POOL FILTER CARTRIDGE WASHER

CROSS-REFERENCE TO RELATED APPLICATION(S)

Not applicable.

FIELD OF THE INVENTION

The present invention relates to the field of pool equipment, more particularly to a cleaner for a pool filter.

DESCRIPTION OF RELATED ART

Water filters, or rather pool filters, are an important component in home pool and hot tub sanitation systems. In order to maintain a clean and sanitary pool or hot tub, the water requires daily filtering to remove dirt, debris, algae, and microbes. Many filter systems use cartridges. Filter cartridges typically consist of 50 to 150 square feet of paper or fiber, folded accordion-style in a tightly packed 12" diameter×36" long tube, although larger filters can be used. Cartridge pool filters require daily cleaning, or they become blocked and loose effectiveness. Manual cleaning of a filter is tedious and difficult, requiring the filter to be held and rotated by hand, all while washing the filter surfaces.

Based on the foregoing, there is a need in the art a cleaning device to facilitate easy and rapid cleaning of cartridge pool filters without excessive manipulation.

SUMMARY OF THE INVENTION

A rotary pool filter cartridge cleaner that comprises a body, a grated floor and spin disk, two spray tubes, a removable top, and water lines. The body is cylindrical and translucent. The bottom end has a grated floor with a ball bearing track, a centered collar, a water intake manifold, and a water-line. Seated on the ball bearing and around the collar is a grated spin-disc. A center sprayer, comprised of a tube, anchors into the collar, running vertically to the top of the body where it is capped and anchored into a recess in a removable top. Water feeds into the center sprayer from a water line through a manifold and is emitted under pressure through a plurality of evenly situated nozzled holes running the length of the tube. The center sprayer has a removable cartridge stabilizer ring which can slide on and off the tube.

A side sprayer is affixed on the inner surface of the body, comprised of a tube running from just above the spin-disk to just below the removable top. The side sprayer has two sets of nozzled holes. One set begins at the top and runs three-quarters of the way down the tube, all holes pointing to the center of the body. The second set spans the bottom quarter of the tube, all holes pointing in the same direction, at an angle off body center. The side sprayer connects to a water line at its bottom. The water line that feeds the center sprayer and the side sprayer connect outside the body in a T coupling, to which is attached a water valve and hose connection.

The device works by inserting a filter cartridge and turning on the water. The cartridge slides over the center sprayer, and the top is secured. When the water is turned on, the inside wall of the cartridge is flushed by high pressure spray from the center, and the outside wall is flushed by high pressure spray from the side. Pressurized water from the bottom hole set on the side-sprayer creates lateral force on the cartridge, causing it to spin on the ball-bearing mounted spin-disc. The stabilizer ring on the center spray tube, being slightly smaller in diameter than the cartridge center, keeps the cartridge from wobbling.

The body can be mounted on foldable legs, or it can have a scalloped bottom for drainage.

The tubes and end cap can be aluminum or PVC.

The spray stem comprises an aluminum tube.

The water valve can have a hose quick connect.

The removable top can be screwed onto a threaded body surface, or by a hinge and latch closure.

The ball bearing mounted spin disc can be aluminum or plastic.

The ring stabilizer can be of different sizes to accommodate varying structures pool cartridge structures.

Advantages

1. Improved speed.
2. Improved convenience.
3. Improved compliance with periodic cleaning requirements.
4. Improved filter life.
5. Reduced cost of cleaning chemicals.

The foregoing, and other features and advantages of the invention, will be apparent from the following, more particular description of the preferred embodiments of the invention, the accompanying drawings, and the claims.

BRIEF DESCRIPTION OF THE DRAWINGS

For a more complete understanding of the present invention, the objects and advantages thereof, reference is now made to the ensuing descriptions taken in connection with the accompanying drawings briefly described as follows.

DETAILED DESCRIPTION OF PREFERRED EMBODIMENTS

Figure 1:
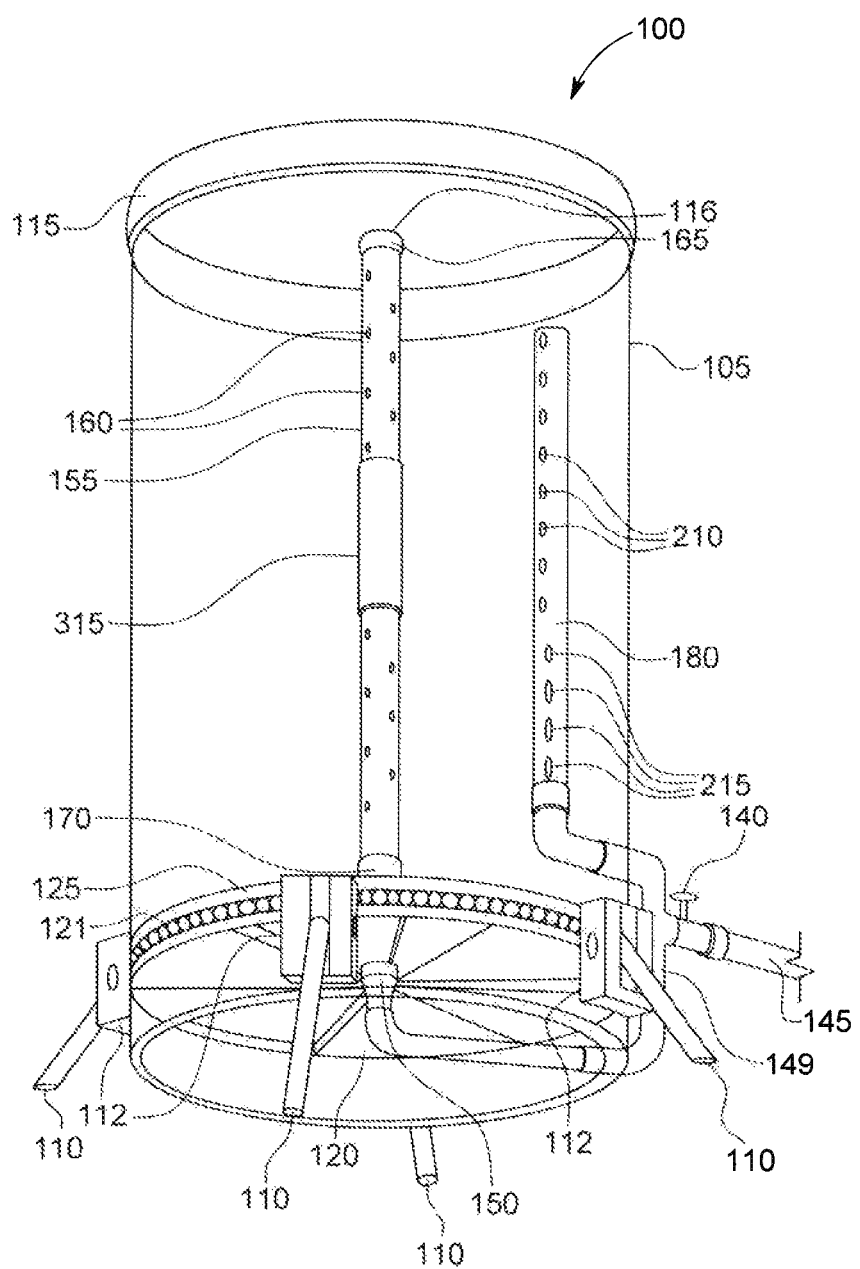
FIG. 1 is a front view of the device from an angle.
Figure 2:
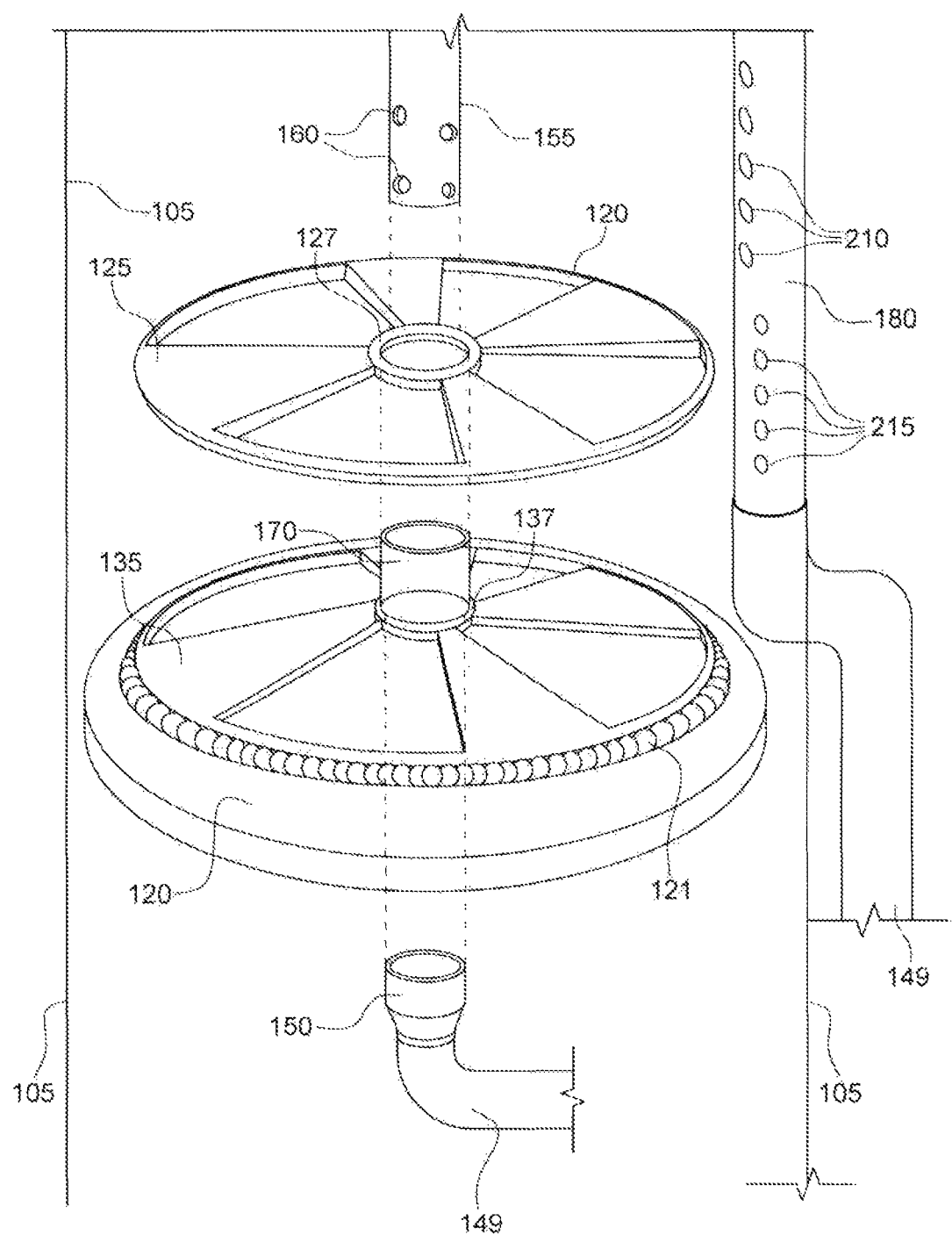
FIG. 2 is an exploded perspective showing how the floor, spin-disc, center spray tube, and water intake are assembled.
Figure 3:
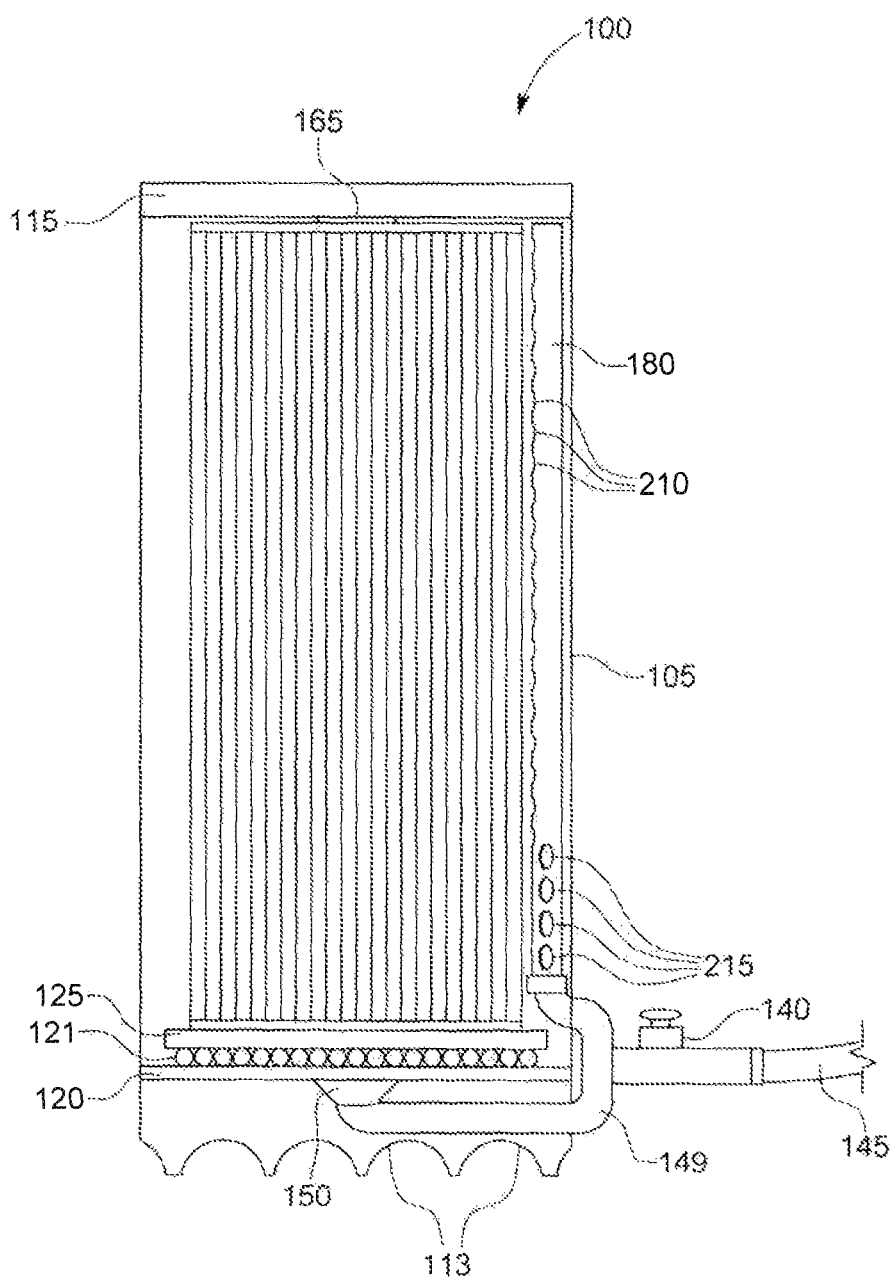
FIG. 3 is a front view of the device loaded with a cartridge.

Preferred embodiments of the present invention and their advantages may be understood by referring to FIGS. 1-3, wherein like reference numerals refer to like elements.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

It is to be further understood that the present invention is not limited to the particular methodology, compounds, materials, manufacturing techniques, uses, and applications, described herein, as these may vary. It is also to be understood that the terminology used herein is used for the purpose of describing particular embodiments only, and is not intended to limit the scope of the present invention. It must be noted that as used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" is a reference to one or more steps or means and may include sub-steps and subservient means. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

Unless defined otherwise, all technical and scientific terms used herein have the same meanings as commonly understood by one of ordinary skill in the art to which this invention belongs. Preferred methods, techniques, devices, and materials are described, although any methods, techniques, devices, or materials similar or equivalent to those described herein may be used in the practice or testing of the present invention. Structures described herein are to be understood also to refer to functional equivalents of such structures. The present invention will now be described in detail with reference to embodiments thereof as illustrated in the accompanying drawings.

From reading the present disclosure, other variations and modifications will be apparent to persons skilled in the art. Such variations and modifications may involve equivalent and other features which are already known in the art, and which may be used instead of or in addition to features already described herein.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

Headings provided herein are for convenience and are not to be taken as limiting the disclosure in any way.

The enumerated listing of items does not imply that any or all of the items are mutually exclusive, unless expressly specified otherwise.

The terms "a", "an" and "the" mean "one or more", unless expressly specified otherwise.

Devices or system modules that are in at least general communication with each other need not be in continuous communication with each other, unless expressly specified otherwise. In addition, devices or system modules that are in at least general communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

As is well known to those skilled in the art many careful considerations and compromises typically must be made when designing for the optimal manufacture of a commercial implementation any system, and in particular, the embodiments of the present invention. A commercial implementation in accordance with the spirit and teachings of the present invention may configured according to the needs of the particular application, whereby any aspect(s), feature(s), function(s), result(s), component(s), approach(es), or step(s) of the teachings related to any described embodiment of the present invention may be suitably omitted, included, adapted, mixed and matched, or improved and/or optimized by those skilled in the art, using their average skills and known techniques, to achieve the desired implementation that addresses the needs of the particular application.

The present invention will now be described in detail with reference to embodiments thereof as illustrated in the accompanying drawings.

FIG. 1 shows a front view of the filter cartridge washer 100 angled upward to better see the bottom structures. The pool filter cartridge washer 100 is designed to rest on the ground while operating. The washer body 105 can comprise a thick, rigid plastic tube or cylinder. The washer body 105 can also include aluminum or plastic folding legs 110. In an embodiment, there are four legs 110 with hinges 112 for folding the legs. The washer body 105 is capped by a removable top 115, which can be secured to the washer body 105 by screw threads (forming a threaded screw closure) or by a hinge and latch/clasp (with the top folding closed against a rubber gasket and secured by a latch/clasp). The washer body 105 can further include a grated bottom 120, with spaces large enough for adequate water drainage. Centered on the bottom is a collar 170, and along the edge of the bottom is a ball-bearing track 121. Centered below the bottom, and feeding into the underside of the collar, is a manifold 150. A water line 149 feeds the manifold, entering laterally from a side of the body 105. A grated spin-disc 125 sits on the bottom 120, around the collar 170, resting directly on the ball-bearing track 121. The grated bottom 120 can be permanently attached or removably attached, such as by a threaded screw attachment.

Rising vertically from the collar is a center sprayer 155. The center sprayer has a cap 165 at its upper end, which secures into a recess 116 in the removable top 115. The center sprayer 155 has a plurality of evenly distributed nozzled holes 160 to pressurize water. In the middle of the center sprayer is a stabilizer ring 315, which keeps a cartridge from wobbling during cleaning. The stabilizer ring 315 is removable and comes in different sizes to accommodate different cartridge makes. The center sprayer 155 can be an aluminum tube or polyvinyl chloride (PVC) tube.

Rising vertically along the inner side of the body 105 is a side sprayer 180. The side sprayer 180 has a top and bottom set of nozzled holes. The top holes 210 run from the top of the side sprayer 180 three-quarters of the way to the bottom, all pointing directly to the body center. The bottom holes 215 run the bottom quarter of the side sprayer. They are larger in size than the top holes 210, and all face the same direction, off the body center, to impose optimal lateral pressure on a cartridge to make it spin.

The bottom of the side sprayer 180 connects to the water line 149. The water line 149 exits the side of the body 105 where it connects to a valved hose connector 140, which in an embodiment, can be a quick connect system already known in the art. A garden hose 145 connected to a water supply provides the water to make the filter cartridge washer 100 operational.

FIG. 2 shows an exploded view of the bottom of the device 100. In this embodiment, the grated bottom 120 is configured with a center ring 137 connected to the edges by spokes 135 to create ample space for water to drain through. Attaching to the center ring 137 is the collar 170. The manifold 150 for water intake connects into the bottom of the collar 170 at its wide end and connects to the water line 149 at its narrow end. The ball bearing track 121 circumvents the edge of the bottom 120.

The spin-disc 125, like the bottom 120, contains a center ring 127 connected to the edges by spokes 125 to also create ample openings for drainage. The center ring 127 fits around the collar 170 on the bottom 120, resting on the ball bearing track 121. From above, the bottom end of the center sprayer 155 inserts into the collar 170, where it is secured. Uniformly spaced nozzled holes 160 in the center sprayer provide pressurized water to wash a cartridge filter from the inside. The side sprayer 180 is positioned along the inner side of the body 105. Nozzelled top holes 210 point to the center of the body 105 to wash a cartridge filter from the outside, while nozzled bottom holes 215 serve to propel a filter cartridge on the spin-disc 120. Portions of the water line 149 are portrayed, showing its supply of the center sprayer 155 and the side sprayer 180.

FIG. 3 is a front-on view of the filter cartridge washer 100 with a filter cartridge inserted. In this embodiment, the filter cartridge washer sits on a scalloped bottom 113, offering an alternative drainage mechanism to legs. From this direct, side-on view, visible is the ball bearing track 121 sandwiched between the bottom 120 and the spin-disc 125. The cartridge spins on the spin-disc 125 when propelled by water jetting from the bottom holes 215 of the side sprayer 180. Water is supplied by a common garden hose 145, through a valved hose connector 140. Past the water valve 140, the water line 149 supplies water to the side sprayer 180, and to the center sprayer by way of a manifold 150 attached to the bottom 120.

The invention has been described herein using specific embodiments for the purposes of illustration only. It will be readily apparent to one of ordinary skill in the art, however, that the principles of the invention can be embodied in other ways. Therefore, the invention should not be regarded as being limited in scope to the specific embodiments disclosed herein, but instead as being fully commensurate in scope with the following claims.

I claim:
1. A filter cartridge cleaner, comprising
a) a body, said body comprised of a cylinder with a bottom, a top, an inside wall, an outside wall, and a center axis;
b) a floor, said floor situated at the bottom of the body and within the inside wall of the body, and comprising a top surface, a bottom surface, a center, a conduit, a mounting collar, a ball bearing track, and a manifold,
   wherein said conduit comprises a circular opening at the center,
   wherein said mounting collar comprises a cylinder connecting to the conduit on the top surface of the floor,
   wherein said manifold comprises a funnel having a top end and a bottom end, said top end being larger in circumference than said bottom end, and said top end attaching to the bottom surface below the conduit,
   wherein the top surface and the bottom surface are intermittently connected by a plurality of openings outside the circumference of the conduit, for water drainage, and
   wherein the ball bearing track comprises a groove containing a plurality of ball bearings, said groove running in a circle around the conduit;
c) a spin disc comprising a disc, said disc having a top surface, a bottom surface, an edge, a center, and a mounting ring,
   wherein said mounting ring comprises a circular opening at the center connecting the bottom surface and the top surface, said mounting ring being slightly larger in diameter than the mounting collar,
   wherein said top surface and bottom surface are intermittently connected by a plurality of openings between the circumference of the mounting ring and the edge, and
   wherein said disc is smaller in diameter than the body and is removably mounted at the mounting ring over the mounting collar onto the floor;
d) a center sprayer comprising a tube having an inside, an outside, a top end, a bottom end, a plurality of openings connecting the inside and the outside, and a cap,
   wherein the bottom end attaches to the floor through the mounting collar, and
   wherein the cap attaches to the top end of the center sprayer;
e) a lid, said lid comprising a top side, a bottom side, an edge, a center, and a stabilizer ring,
   wherein said lid is removably attached to the top of the body,
   wherein said stabilizer ring
      is situated on the bottom side of the lid at the center, and
      is slightly larger in diameter than the cap on the top end of the center sprayer, and
      receives the cap on the top end of the center sprayer, attaching the lid to the center sprayer;
f) a side sprayer, said side sprayer comprising a tube having an inside, and outside, a top end, a bottom end, a plurality of centered openings, a plurality of angled openings, and a cap,
   wherein the side sprayer is affixed longitudinally along the inside wall of the body,
   wherein the centered openings face the center axis of the body and run three-quarters the length of the tube from the top end, wherein the angled openings one-quarter the length of the tube from the bottom end, and are uniformly directed off the center axis, and wherein the cap is affixed to the top end;

g) a water line, said water line comprising a tube with a first end, a second end, a midsection, a valve, and a hose wherein the first end contains a connector for attaching to the bottom end of the manifold, wherein the second end has a connector for attaching to the bottom end of the side sprayer, wherein the midsection has a connector to the valve, and wherein the valve has a connector to a hose.

2. The filter cartridge cleaner of claim 1, wherein the center sprayer and the side sprayer contain a plurality of nozzled openings, to add pressure to the water spray.

3. The filter cartridge cleaner of claim 1, wherein a stabilizer ring attaches slideably over the center sprayer, said stabilizer ring comprising a flexible cylinder, for preventing filter cartridge wobble during rotation.

4. The filter cartridge cleaner of claim 3, wherein there are a plurality of stabilizer rings, each having a different thickness, to accommodate construction variations between filter cartridge models.

5. The filter cartridge cleaner of claim 1, wherein the valve and hose is connected by a quick connector.

6. The filter cartridge cleaner of claim 1, wherein the tube of the center sprayer is aluminum.

7. The filter cartridge cleaner of claim 1, wherein the tube of the center sprayer is PVC.

8. The filter cartridge cleaner of claim 1, wherein the tube of the side sprayer is aluminum.

9. The filter cartridge cleaner of claim 1, wherein the tube of the side sprayer is PVC.

10. The filter cartridge cleaner of claim 1, wherein the groove of the floor contains a plurality of wheels, said wheels being mounted on axles and free spinning in the direction of spin disc rotation.

11. The filter cartridge cleaner of claim 1, wherein bottom of the spin disc has a plurality of wheels free spinning in the direction of rotation.

12. The filter cartridge cleaner of claim 1, wherein the lid and body include threads embedding in said lid and body for screw connection.

13. The filter cartridge cleaner of claim 1, wherein the lid attaches to the body by latches.

14. The filter cartridge cleaner of claim 1, wherein the plurality of openings in the center sprayer are evenly distributed over the tube.

15. The filter cartridge cleaner of claim 1, wherein the plurality of centered openings in the side sprayer are evenly spaced apart from each other.

16. The filter cartridge cleaner of claim 1, wherein the plurality of angled openings in the side sprayer are evenly spaced apart from each other.

17. The filter cartridge cleaner of claim 1, wherein the body is translucent plastic.

18. A method of cleaning pool filter cartridges comprising the steps of:

a) providing a pool filter cartridge cleaning device wherein the cleaning device includes a body, said body comprised of a cylinder with a bottom, a top, an inside wall, an outside wall, and a center axis; a floor, said floor situated at the bottom of the body and within the inside wall of the body, and comprising a top surface, a bottom surface, a center, a conduit, a mounting collar, a ball bearing track, and a manifold, wherein said conduit comprises a circular opening at the center, wherein said mounting collar comprises a cylinder connecting to the conduit on the top surface of the floor, wherein said manifold comprises a funnel having a top end and a bottom end, said top end being larger in circumference than said bottom end, and said top end attaching to the bottom surface below the conduit, wherein the top surface and the bottom surface are intermittently connected by a plurality of openings outside the circumference of the conduit, for water drainage, and wherein the ball bearing track comprises a groove containing a plurality of ball bearings, said groove running in a circle around the conduit: a spin disc comprising a disc, said disc having a top surface, a bottom surface, an edge, a center, and a mounting ring, wherein said mounting ring comprises a circular opening at the center connecting the bottom surface and the top surface, said mounting ring being slightly larger in diameter than the mounting collar, wherein said top surface and bottom surface are intermittently connected by a plurality of openings between the circumference of the mounting ring and the edge, and wherein said disc is smaller in diameter than the body and is removably mounted at the mounting ring over the mounting collar onto the floor; a center sprayer comprising a tube having an inside; an outside, a top end, a bottom end, a plurality of openings connecting the inside and the outside, and a cap, wherein the bottom end attaches to the floor through the mounting collar, and wherein the cap attaches to the top end of the center sprayer; a lid, said lid comprising a top side, a bottom side, an edge, a center, and a stabilizer ring, wherein said lid is removably attached to the top of the body, wherein said stabilizer ring is situated on the bottom side of the lid at the center, and is slightly larger in diameter than the cap on the top end of the center sprayer, and receives the cap on the top end of the center sprayer, attaching the lid to the center sprayer; a side sprayer, said side sprayer comprising a tube having an inside, and outside, a top end, a bottom end, a plurality of centered openings, a plurality of angled openings, and a cap, wherein the side sprayer is affixed longitudinally along the inside wall of the body, wherein the centered openings face the center axis of the body and run three-quarters the length of the tube from the top end, wherein the angled openings one-quarter the length of the tube from the bottom end, and are uniformly directed off the center axis, and wherein the cap is affixed to the top end; a water line, said water line comprising a tube with a first end, a second end, a midsection, a valve, and a hose wherein the first end contains a connection means for attaching to the bottom end of the manifold, wherein the second end has a connection means for attaching to the bottom end of the side sprayer, wherein the midsection has a connector to connect the valve, and wherein the valve connects to a hose;

b) attaching a hose to said valve connector to said filter cartridge cleaner;

c) removing the lid of said filter cartridge cleaner;

d) inserting a stabilizer ring sized to said filter cartridge to be cleaned over said center sprayer;

e) inserting said filter cartridge to be cleaned into said body and over the center spray of said filter cartridge cleaning device;

f) connecting a hose connected to a water supply;

g) turning the valve to the "on" position on the filter cartridge cleaning device;
h) turning the valve to the "off" position after the filter cartridge has been flushed and cleaned;
i) opening the lid of said filter cartridge cleaning device and removing the cleaned filter cartridge.

* * * * *